DEFENSIVE PUBLICATION T861031

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 705

743,029

ETHYLENICALLY UNSATURATED HYDROCARBON POLYMERS TREATED WITH BORON COMPOUNDS

Anestis Leonidas Logothetis, Wilmington, Del., assignor to E. I. du Pont de Nemours and Company, Wilmington, Del., a corporation of Delaware

Filed July 8, 1968. Published Apr. 15, 1969
Class 260—80.78
No Drawing. 16 Pages Specification

Ethylenically unsaturated, elastomeric, sulfur curable hydrocarbon polymers, particularly copolymers of at least one alpha-monoolefin and at least one non-conjugated diene, are reacted in bulk (optionally containing 150 parts per 100 parts of petroleum oil) or solution at room temperature to 250° C., preferably 50–225° C., with boranes $BH_3$, $B_2H_6$, or $RBH_2$ (R is $C_1$–$C_{18}$ alkyl, aryl, or substituted aryl, to reduce the cold flow of the elastomer while maintaining sulfur-curability and not effecting significant gelation. The borane supplies about 0.002 to 0.1 gram-atoms of B per kilogram of polymer. The borane can be derived from complexes with ethers, ammonia, amines ($R'_nNH_m$), phosphines ($R'_3P$), and arsines ($R'_3As$) where R′ is H, $C_1$–$C_{18}$ alkyl, cycloalkyl, aryl, alkaryl, pyridyl, furyl, and thienyl, $n=0$–3, $m=d-n$. Trioctylamine borane is representative. Optionally, the borane can be supplied as a solution in petrolatum, decalin, or high boiling oil (preferably less than 10% by weight of the polymer). If the polymer is treated in an extruder, the extrudate should be cooled in a protective atmosphere.

The treated polymers can be returned partly or wholly to their original state by mixing them with 1–5 moles of a carboxylic acid, e.g., stearic acid, per gram-atom of B. ZnO or CdO will prevent this change if added ahead of the acid.